(12) United States Patent
Hermann et al.

(10) Patent No.: US 8,557,414 B2
(45) Date of Patent: Oct. 15, 2013

(54) CONTROL, COLLECTION AND USE OF METAL-AIR BATTERY PACK EFFLUENT

(75) Inventors: Weston Arthur Hermann, Palo Alto, CA (US); Jeffrey Brian Straubel, Menlo Park, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 415 days.

(21) Appl. No.: 13/035,776

(22) Filed: Feb. 25, 2011

(65) Prior Publication Data

US 2012/0041628 A1 Feb. 16, 2012

Related U.S. Application Data

(63) Continuation-in-part of application No. 12/887,557, filed on Sep. 22, 2010, now Pat. No. 8,423,215, and a continuation-in-part of application No. 13/013,852, filed on Jan. 26, 2011, now Pat. No. 8,298,692.

(60) Provisional application No. 61/372,351, filed on Aug. 10, 2010.

(51) Int. Cl.
*H01M 10/44* (2006.01)
*B60K 1/00* (2006.01)

(52) U.S. Cl.
USPC ............... 429/50; 429/64; 429/72; 429/120; 180/54.1; 180/65.21

(58) Field of Classification Search
None
See application file for complete search history.

(56) References Cited

U.S. PATENT DOCUMENTS

| 4,448,858 A | 5/1984 | Graf et al. |
| 6,165,633 A | 12/2000 | Negishi |
| 8,229,615 B2 | 7/2012 | Sakamoto et al. |

*Primary Examiner* — Cynthia K. Walls
(74) *Attorney, Agent, or Firm* — Patent Law Office of David G. Beck

(57) ABSTRACT

A system and method for maintaining an ambient oxygen concentration below a preset concentration while charging a metal-air battery pack is provided, the system utilizing an on-board means for collecting and storing the oxygen-rich effluent generated during the charge cycle.

20 Claims, 6 Drawing Sheets

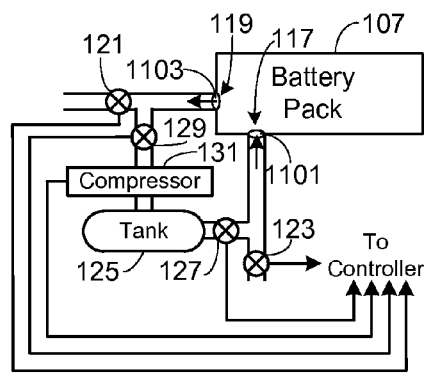
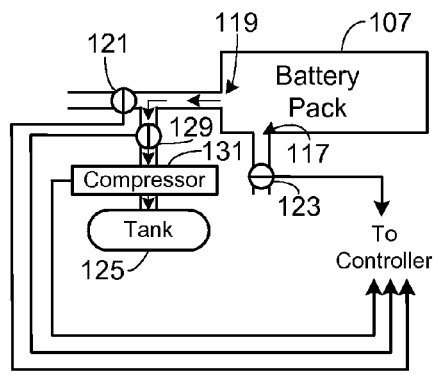
FIG. 11
FIG. 12
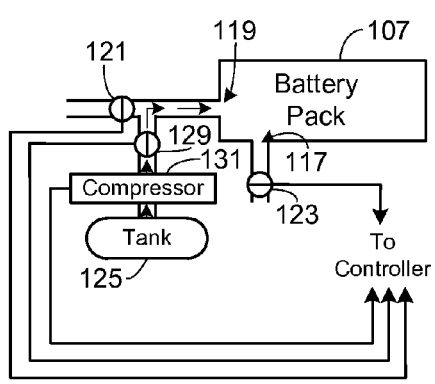
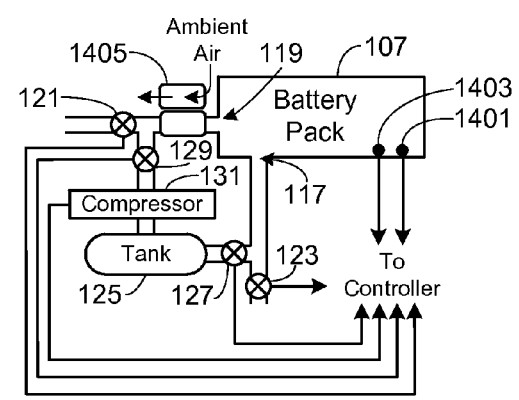
FIG. 13
FIG. 14

CONTROL, COLLECTION AND USE OF METAL-AIR BATTERY PACK EFFLUENT

CROSS-REFERENCE TO RELATED APPLICATION

This application is a continuation-in-part of U.S. patent application Ser. Nos. 12/887,557, filed Sep. 22, 2010, and 13/013,852, filed Jan. 26, 2011, and claims benefit of the filing date of U.S. Provisional Patent Application Ser. No. 61/372,351, filed Aug. 10, 2010, the disclosures of which are incorporated herein by reference for any and all purposes.

FIELD OF THE INVENTION

The present invention relates generally to batteries and, more particularly, to means for minimizing the flammability risks associated with metal-air cells while increasing metal-air battery pack efficiency through utilization of battery pack effluent.

BACKGROUND OF THE INVENTION

A metal-air cell is a type of battery that utilizes the same energy storage principles as a more conventional cell such as a lithium ion, nickel metal hydride, nickel cadmium, or other cell type. Unlike such conventional cells, however, a metal-air cell utilizes oxygen as one of the electrodes, typically passing the oxygen through a porous metal electrode. The exact nature of the reaction that occurs in a metal-air battery depends upon the metal used in the anode and the composition of the electrolyte. Exemplary metals used in the construction of the anode include zinc, aluminum, magnesium, iron, lithium and vanadium. The cathode in such cells is typically fabricated from a porous structure with the necessary catalytic properties for the oxygen reaction. A suitable electrolyte, such as potassium hydroxide in the case of a zinc-air battery, provides the necessary ionic conductivity between the electrodes while a separator prevents short circuits between the battery electrodes.

Due to the use of oxygen as one of the reactants, metal-air cells have some rather unique properties. For example, since the oxygen does not need to be packaged within the cell, a metal-air cell typically exhibits a much higher capacity-to-volume, or capacity-to-weight, ratio than other cell types making them an ideal candidate for weight sensitive applications or those requiring high energy densities.

Regardless of the composition and mechanical nature of the elements used in a metal-air battery, oxygen is required for the reaction to take place. Therefore during the discharge cycle, the reaction rate of the cell may be varied by controlling the flow of oxygen into the cell. During the charging cycle, the metal oxides or ions are reduced to form the metal comprising the anode and oxygen is emitted by the cell.

While metal-air cells offer a number of advantages over a conventional rechargeable battery, most notably their extremely high energy density, such cells also have a number of drawbacks. For example, care must be taken to insure a sufficient supply of air to the cells during discharge cycles, and means for handling the oxygen emitted from the cells during the charge cycles, both of these issues becoming increasingly important as the number of metal-air cells and/or the size of the cells increase to meet the demands of larger applications.

Accordingly, while metal-air cells offer some intriguing benefits, such as their high energy densities, their shortcomings must be taken into account in order to successfully integrate the cells into a system.

SUMMARY OF THE INVENTION

The present invention provides a system and method for maintaining an ambient oxygen concentration below a preset concentration while charging a metal-air battery pack, the system utilizing an on-board means for collecting and storing the oxygen-rich effluent generated during charging.

In at least one embodiment of the invention, a battery pack control system is disclosed that includes a battery pack with at least one metal-air cell, at least one oxygen sensor, a gas tank, a compressor, an exhaust port and a system controller. The system controller is configured to determine the oxygen concentration level and then pass the oxygen-rich effluent generated during battery pack charging through the exhaust port when the oxygen concentration is below a preset level, and pass the oxygen-rich effluent to the compressor and gas tank for storage when the oxygen concentration is greater than the preset level. The system may also include a state-of-charge (SOC) detection system, wherein the system controller terminates operation of the charging system when the monitored SOC reaches a target SOC. The at least one oxygen sensor may be mounted at one or more locations including (i) proximate to the exhaust port, and (ii) mounted to the vehicle such that external vehicle environmental conditions may be monitored. The system controller may be configured to pass the oxygen-rich effluent through the exhaust port upon initiation of battery pack charging. The system controller may be configured to pass the oxygen-rich effluent to the compressor and tank upon initiation of battery pack charging, and to pass the oxygen-rich effluent through the exhaust port when the oxygen concentration is less than the preset level and the tank is full. The system controller may be configured to pass the oxygen-rich stored in the tank to the battery pack inlet during the battery pack discharge cycle. The system may also include a heat exchanger interposed between the battery pack and the compressor.

In at least one other embodiment of the invention, a method of operating a metal-air battery pack is provided, the method comprising the steps of coupling a metal-air battery pack to an external charging power source via a battery charging system; coupling a battery pack outlet to a gas tank inlet, where a compressor is interposed between the battery pack outlet and the gas tank inlet; compressing oxygen-rich effluent passing through the battery pack outlet with the compressor; storing the oxygen-rich effluent compressed by the compressor in the gas tank; monitoring the fill level of the gas tank; comparing the fill level to a maximum tank level; coupling the battery pack outlet to an ambient air exhaust system when the fill level reaches the maximum tank level; and decoupling the battery pack outlet from the tank inlet and terminating the compressing and storing steps when the fill level reaches the maximum tank level. The method may further comprise the steps of determining the present battery pack state-of-charge (SOC); comparing the present SOC to a target SOC; and terminating charging when the present SOC reaches or exceeds the target SOC. The method may further comprise the steps of determining the oxygen concentration level within a first region; comparing the oxygen concentration level to a preset level; suspending charging if the oxygen concentration exceeds the preset level; and resuming charging when the oxygen concentration falls below the preset level. The method may further comprise the steps of decoupling the battery pack outlet from the ambient air exhaust system and opening an ambient air battery pack inlet during a battery pack discharge cycle. The method may further comprise the steps of decoupling the battery pack outlet from the ambient air exhaust system, coupling the tank outlet to the battery pack inlet, and transferring oxygen-rich effluent from the gas tank to the battery pack during a battery pack discharge cycle.

In at least one other embodiment of the invention, a method of operating a metal-air battery pack is provided, the method comprising the steps of coupling a metal-air battery pack to an external charging power source via a battery charging system; coupling a battery pack outlet to an ambient air exhaust system; exhausting oxygen-rich effluent generated during battery pack charging through the ambient air exhaust system; determining the oxygen concentration level within a first region; comparing the oxygen concentration level to a preset level; decoupling the battery pack outlet from the ambient air exhaust system and coupling the battery pack outlet to the tank inlet of a gas tank mounted within the vehicle if the monitored oxygen concentration exceeds the preset level; and compressing and storing the oxygen-rich effluent in the gas tank. The method may further comprise the steps of comparing the oxygen concentration level to a second preset level, wherein if the oxygen concentration falls below the second preset level, the method further comprises the steps of decoupling the battery pack outlet from the tank inlet; terminating the compression and storage steps; coupling the battery pack outlet to the ambient air exhaust system; and exhausting the oxygen-rich effluent through the ambient air exhaust system. The second preset level may be less than or equal to the preset oxygen concentration level. The method may further comprise the steps of determining the present battery pack state-of-charge (SOC); comparing the present SOC to a target SOC; and terminating charging when the present SOC reaches or exceeds the target SOC. During a battery pack discharge cycle, the method may further comprise the steps of decoupling the battery pack outlet from the ambient air exhaust system, decoupling the battery pack outlet from the tank inlet, and opening an ambient air battery pack inlet. During a battery pack discharge cycle, the method may further comprise the steps of decoupling the battery pack outlet from the ambient air exhaust system, decoupling the battery pack outlet from the tank inlet, coupling a tank outlet to a battery pack inlet, and transferring oxygen-rich effluent stored in the tank to the battery pack inlet.

A further understanding of the nature and advantages of the present invention may be realized by reference to the remaining portions of the specification and the drawings.

BRIEF DESCRIPTION OF THE DRAWINGS

FIG. 11 illustrates an alternate embodiment utilizing one-way valves;

FIG. 12 illustrates an alternate embodiment, the figure showing the system operating in the charge cycle;

FIG. 13 illustrates the embodiment shown in FIG. 12 with the system operating in the discharge cycle;

FIG. 14 illustrates an alternate configuration that includes a heat exchanger as well as a battery pack pressure sensor and oxygen sensor;

DESCRIPTION OF THE SPECIFIC EMBODIMENTS

Figure 1:
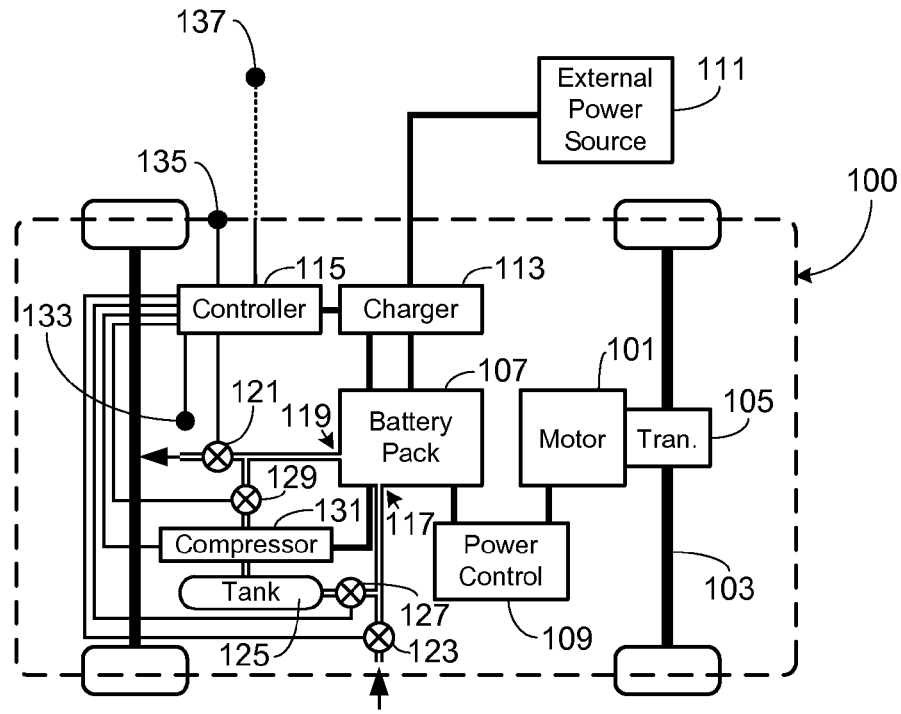
FIG. 1 illustrates the basic elements of a system for collecting, storing and re-using oxygen-rich effluent that is generated during the charge cycle of a metal-air battery pack, the system utilizing an internally mounted charger.

In the following text, the terms "battery", "cell", and "battery cell" may be used interchangeably. The term "battery pack" as used herein refers to one or more individual batteries that are electrically interconnected to achieve the desired voltage and capacity for a particular application, the individual batteries typically contained within a single piece or multi-piece housing. The term "electric vehicle" as used herein refers to an all-electric vehicle, also referred to as an EV, a plug-in hybrid vehicle, also referred to as a PHEV, or a hybrid vehicle (HEV), and/or a hybrid vehicle utilizing multiple propulsion sources one of which is an electric drive system. It should be understood that identical element symbols used on multiple figures refer to the same component, or components of equal functionality. Additionally, the accompanying figures are only meant to illustrate, not limit, the scope of the invention and should not be considered to be to scale.

Given the high energy density and the large capacity-to-weight ratio offered by metal-air cells, they are well suited for use in electric vehicles, either as a stand-alone electrical power source or in conjunction with one or more other power sources, for example, a lithium ion battery pack. Regardless of whether a vehicle uses a metal-air battery pack alone or in combination with another battery pack, the size of the metal-air battery pack in either configuration is likely to be quite large. As a result, during battery charging a large amount of oxygen is expected to be generated. For example, assuming a 100 kWh metal-air battery pack, during charging such a pack will release approximately 19 cubic meters of oxygen. As a consequence, in a relatively small confined region such as a single car garage, the charging of such a battery pack can easily double the oxygen concentration from the normal concentration of 20.95% to over 40%, both concentrations being expressed relative to other compounds within the air. Accordingly, charging a large metal-air battery pack in a confined area can increase the oxygen concentration dramatically, thereby decreasing the lower explosive limit or lower flammable limit (LEL/LFL) of vapors within the confined region (e.g., gasoline used in a lawn mower stored in the garage), decreasing the autoignition temperature (AIT) of combustible materials contained within the same confined region (e.g., garage construction materials as well as various items/materials possibly stored within the garage), and similarly decreasing the flash point of liquids stored within the same confined region (e.g., cleaning supplies stored within the garage). As such it will be appreciated that care must be taken during charging to avoid reaching unsafe oxygen concentrations.

The system disclosed herein may be used to insure that charging the metal-air battery pack does not cause the oxygen concentration in the surrounding environment to increase beyond a preset limit. Additionally, the disclosed system provides a way of utilizing at least a portion of the oxygen generated during charging to enhance operation of the metal-air battery pack during the discharge cycle, improving the metal-air battery pack's power capabilities by providing it with an oxygen-rich source of air.

Figure 2:
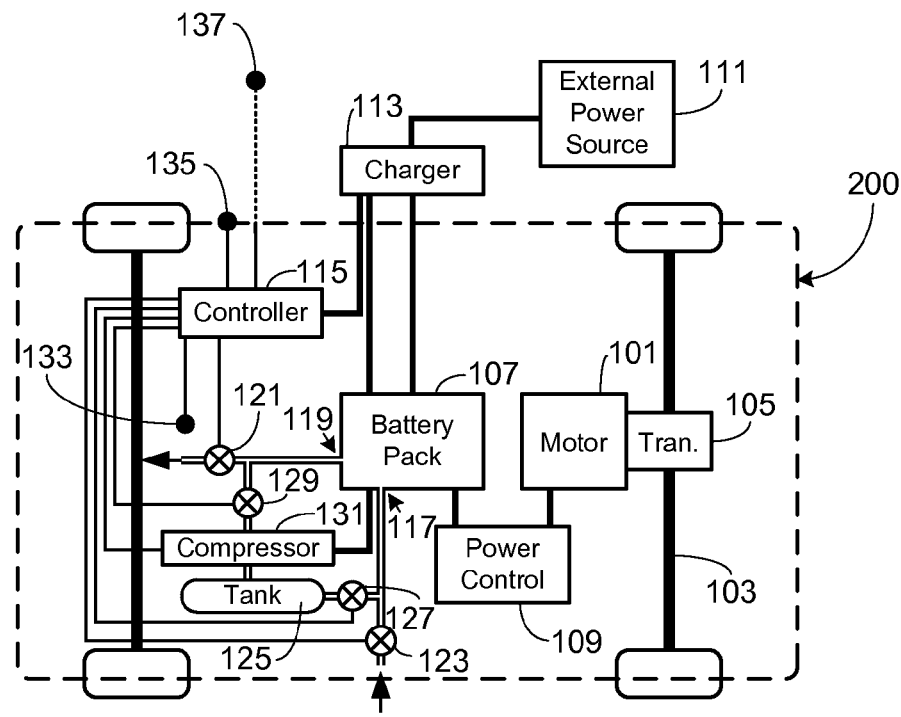
FIG. 2 illustrates an alternate configuration from that shown in FIG. 1, the alternate configuration utilizing an externally mounted charger.

FIGS. 1 and 2 illustrate the basic elements of an oxygen concentration control system in accordance with the invention. Although the system is shown implemented in an electric vehicle, i.e., electric vehicle 100 in FIG. 1 and electric vehicle 200 in FIG. 2, it should be understood that the disclosed system may be used with other systems utilizing a large metal-air battery pack, including non-vehicular systems (e.g., boats, residential or commercial battery systems, etc.). For illustration purposes, the drive systems shown in FIGS. 1 and 2 use a single electric motor 101 coupled to axle 103 via a transmission/differential assembly 105. It will be appreciated that the invention is equally applicable to vehicles using multiple motors coupled to one or both axles. Similarly, the invention is not limited to a specific type/configuration of transmission (e.g., single speed, multi-speed) or a specific type/configuration of differential (e.g., open, locked or limited slip).

Battery pack 107 is comprised of metal-air cells and provides the electrical power required by motor 101 and, in some applications, required by various on-board auxiliary systems (e.g., HVAC, lights, entertainment subsystem, navigation subsystem, etc.). While the invention may be used with vehicles that utilize both a metal-air battery pack and at least one other battery pack, e.g., a lithium-ion battery pack, additional battery packs are not shown in the illustrations as they are not necessary for the operation and implementation of the present invention. Additionally, it should be understood that a vehicle may utilize multiple metal-air battery packs, for example to distribute the weight throughout the vehicle, and that the present invention is equally applicable to such configurations.

Battery pack 107 is coupled to motor 101 via a power control module 109, module 109 typically including a DC to AC converter. Power control module 109 insures that the power delivered to motor 101 has the desired voltage, current, waveform, etc. As such, power control module 109 may be comprised of passive power devices (e.g., transient filtering capacitors and/or inductors), active power devices (e.g., semiconductor and/or electromechanical switching devices, circuit protection devices, etc.), sensing devices (e.g., voltage, current, and/or power flow sensors, etc.), logic control devices, communication devices, etc.

During battery pack charging, battery pack 107 is coupled to an external power source 111 (e.g., wall socket, dedicated charging station, etc.) via a charging circuit 113. A controller 115, coupled to charger 113, controls operation of the charger, preferably controlling not only its status (on/off), but also its charge rate. Preferably controller 115 is built-in to charger 113, although it can be separate as shown. Note that charger 113 can be mounted within the vehicle as illustrated in FIG. 1, or external to the vehicle as shown relative to vehicle 200. In the embodiment illustrated in FIG. 2, controller 115 may be external to the vehicle, although it is preferably internal to the vehicle as shown, thus allowing the vehicle to be charged in a variety of situations with various chargers while still allowing the vehicle's system to determine optimal charge rate, etc.

Battery pack 107 includes an air inlet 117 and an air outlet 119. While the air inlet and air outlet are shown as being separate in this embodiment, it will be appreciated that other configurations may be employed without departing from the invention. For example, each battery pack vent may be used as either an air inlet or an air outlet, depending upon the position (i.e., opened or closed) of the various valves associated with the vents as well as the current operational cycle of the battery pack, i.e., charge cycle or discharge cycle.

In the illustrated embodiment, valve 121 controls the air flow from battery pack 107 to the outside environment (for example, via an exhaust port) and valve 123 controls the air flow into battery pack 107 from the outside environment. Coupled via piping to both battery pack inlet 117 and outlet 119 is high pressure gas tank 125, tank 125 being coupled to inlet 117 via valve 127 and to outlet 119 via valve 129. A compressor 131 is interposed between battery pack outlet 119 and tank 125, compressor 131 preferably receiving power from the external power source 111 via charger 113 as shown. Preferably operation of valves 121, 123, 127 and 129 as well as compressor 131 are automated using a controller, e.g., controller 115. Note that while controller 115 is used in the illustrated embodiment to provide automated control, a different controller that is separate from charge controller 115 may be used to operate the oxygen control system of the invention.

In the preferred embodiment of the invention, tank 125 is too small to hold all of the oxygen-rich effluent generated by battery pack 107 during a full charge cycle. The restrictions on the size of tank 125 may be due to size and/or weight constraints imposed by the vehicle, or simply a design choice. Given the size limitations of tank 125, the presently disclosed system insures that charging the metal-air battery pack does not cause the oxygen concentration in the surrounding environment to increase beyond a preset limit. The limit used herein is a maximum oxygen concentration of 25% in air. It should be appreciated, however, that the invention may be used with other maximum oxygen concentrations, as such concentration limits may be set by regional, state or federal governments or other parties tasked with setting various safety regulations.

In order to provide the intended control over the oxygen concentration of the surrounding environment during charging, controller 115 is coupled to one or more oxygen sensors, controller 115 receiving data signals from the sensors that correspond to oxygen concentration levels. In at least one embodiment, controller 115 is coupled to an oxygen sensor 133 that is mounted in close proximity to battery pack 107, and preferably mounted in close proximity to the channel or channels where the oxygen generated during the charging cycle is emitted, or mounted in close proximity to the battery pack inlet channel or channels. In at least one embodiment, instead of an oxygen sensor 133 which is mounted proximate to the battery pack, or in combination with sensor 133, controller 115 is coupled to an oxygen sensor 135 that is mounted at some distance from the battery pack. The purpose of sensor 135 is to provide a value for the oxygen concentration that is more representative of the ambient environment, rather than the environment immediately surrounding the battery pack.

Sensor 135 may be mounted within the passenger compartment, under the vehicle and exposed to the underside environment, or mounted to some other location (e.g., within a bumper, within the grill, near a body panel juncture to allow the sensor to be hidden, etc.). In addition to sensors 133 and 135, or as a replacement for one or both sensors 133 and 135, the vehicle may be coupled to an externally mounted sensor 137, sensor 137 being mounted within the garage or other charging location (e.g., a charging bay). Preferably the electrical interconnect to couple sensor 137 to controller 115 is contained within the same plug/jack arrangement that is used to couple the vehicle to the external charging station, thus simplifying coupling.

There are two primary modes of operation of the present system. In the first mode, oxygen-rich effluent generated during battery pack charging is initially used to fill tank 125. Once tank 125 is filled and the oxygen-rich effluent is passing directly into the ambient environment, the oxygen concentration monitoring and control system of the present invention is used to insure that the oxygen concentration in the ambient environment does not exceed the preset limit. In the second mode of operation, during charging the generated oxygen-rich effluent is transferred directly to the ambient environment. Whenever the oxygen concentration monitoring system of the present invention determines that the oxygen concentration is greater than desired, the oxygen-rich effluent is transferred into tank 125, thereby preventing a further rise in oxygen concentration in the ambient environment. Once the oxygen concentration level in the ambient falls below a preset value, further storage of effluent within tank 125 is deemed unnecessary and the effluent is once again allowed to pass directly into the ambient environment. Each of these modes of operation is described in detail below.

FIGS. 3-14 illustrate airflow within the system during various stages of operation, thus providing further insight into operation of the oxygen control system of the present invention. As these figures are only used to show airflow, only the principal components required for airflow control are shown even though clearly other components, such as those described above, are required for implementation of the invention in a full system.

Figure 3:
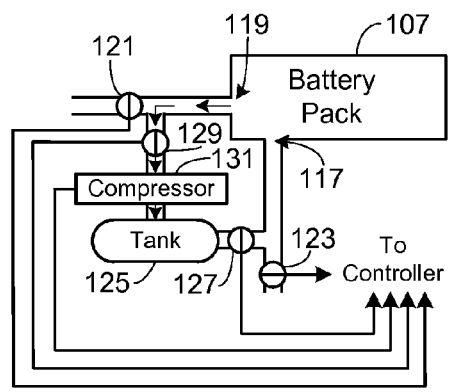
FIG. 3 illustrates a charge cycle with the oxygen-rich effluent being captured in accordance with the invention.
Figure 4:
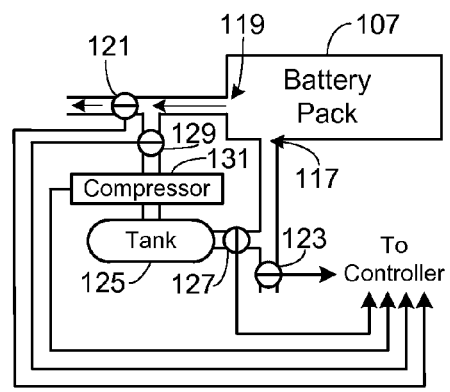
FIG. 4 illustrates a charge cycle with the oxygen-rich effluent not being captured.
Figure 5:
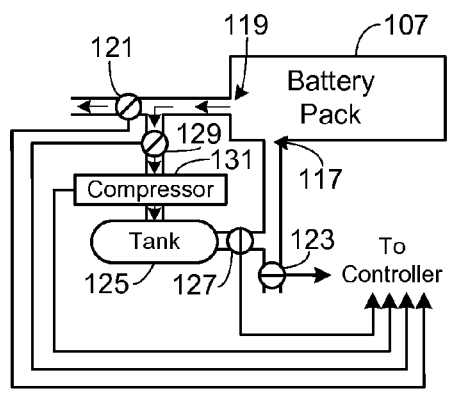
FIG. 5 illustrates the charge cycle in which a portion of the oxygen-rich effluent is captured and a portion is allowed to pass into the ambient environment.
Figure 6:
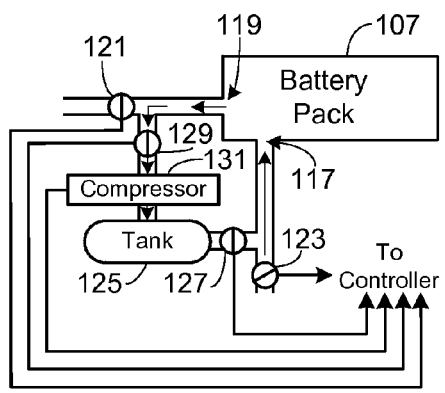
FIG. 6 illustrates the charge cycle shown in FIG. 3, with a battery pack inlet at least partially opened.

In FIG. 3, battery pack 107 is being charged by charger 113 (not shown in FIGS. 3-14). As such, oxygen-rich effluent is produced by the pack. By closing valves 121, 123 and 127 and opening valve 129, the oxygen-rich effluent is introduced to the inlet of compressor 131. Compressor 131 then compresses this oxygen-rich effluent and stores it within high pressure gas tank 125. If the oxygen-rich effluent is not intended for storage, either due to tank 125 being full or based on the monitored oxygen concentration within the ambient environment, then valve 121 may be opened and valve 129 closed, thus allowing the effluent to exit the system to the ambient environment as illustrated in FIG. 4. Clearly in this mode of operation compressor operation is also terminated once the compressor inlet is disconnected from the output stream of battery pack 107. Note that if desired, the oxygen-rich effluent may be allowed to pass through the compressor to the tank as well as to the outside environment by opening, at least to some degree, both valves 121 and 129 as illustrated in FIG. 5. While valves 123 and 127 are typically closed during the charge cycle, in some instances it is preferable to open valve 123 slightly, thus allowing a slight flow of ambient air through battery pack 107, thereby ensuring that compressor 131 receives a sufficient supply of air to its inlet (see, for example, FIG. 6, which is a modification of the mode shown in FIG. 3). This same result can also be achieved by modulating compressor 131 based on the pressure at the compressor inlet.

Figure 7:
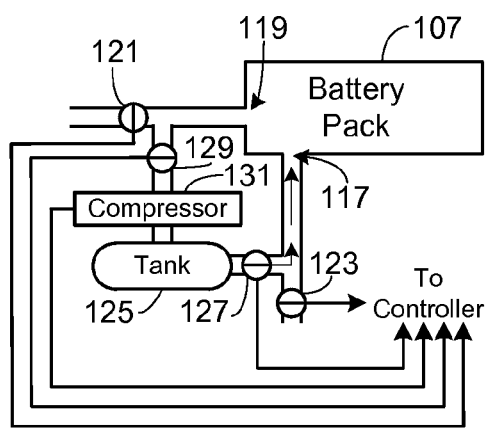
FIG. 7 illustrates a discharge cycle with the oxygen-rich effluent being used in accordance with the invention.
Figure 8:
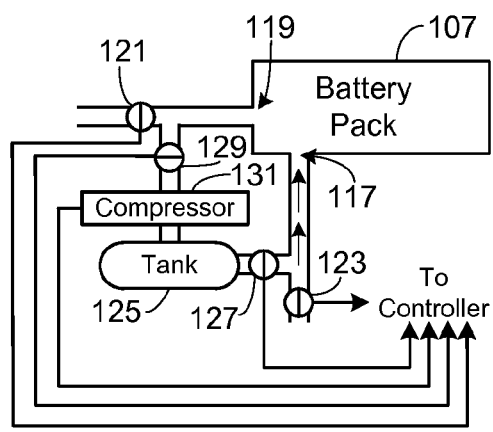
FIG. 8 illustrates a discharge cycle with the battery pack open to ambient.
Figure 9:
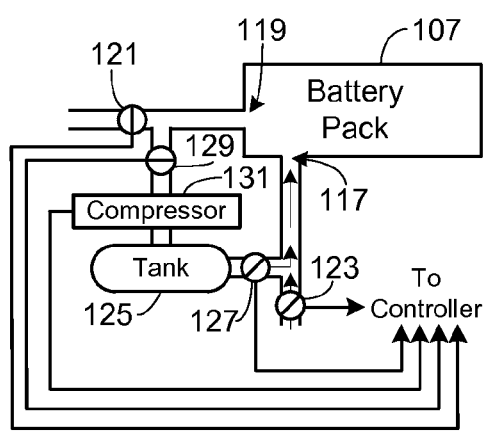
FIG. 9 illustrates a discharge cycle with the battery pack open to ambient and at least partially supplanted with the collected oxygen-rich effluent.
Figure 10:
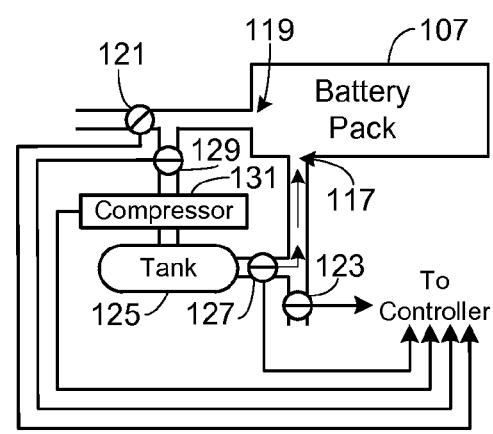
FIG. 10 illustrates the discharge cycle shown in FIG. 7, with a battery pack outlet at least partially opened.

In FIG. 7, battery pack charging is terminated and the battery pack is being discharged, for example in order to provide power to motor 101 (shown in FIGS. 1 and 2). As such, compressor 131 operation is terminated and valves 121 and 129 are closed. In the mode of operation illustrated in FIG. 7, valve 127 is opened and valve 123 is closed, thus providing battery pack 107 with the previously stored oxygen-rich effluent. Alternately, valve 123 may be opened and valve 127 closed, as illustrated in FIG. 8, thus supplying battery pack with ambient air. Alternately, and as shown in FIG. 9, both valves 123 and 127 may be opened, to varying amounts, thus allowing the oxygen-rich effluent stored in tank 125 to supplant at least a portion of the ambient air stream. While valves 121 and 129 are typically closed during the discharge cycle, in some instances it is preferably to open valve 121 slightly, thus allowing a flow of air through battery pack 107, thereby preventing air stagnation and ensuring that the metal-air cells receive sufficient oxygen during this operational cycle (see, for example, FIG. 10, which is a modification of the mode shown in FIG. 7). As discussed further below, typically this goal is best achieved by monitoring battery pack pressure and/or oxygen concentration and varying inlet and outlet valves to insure adequate air flow and sufficient oxygen.

FIG. 11 illustrates a minor modification of the previously described system. As shown, battery pack inlet 117 includes a one-way valve 1101 and battery pack outlet 119 includes a one-way valve 1103. The use of one-way valves in one or both battery pack inlets/outlets may be used to simplify system operation. For example, during battery pack charging, valve 123 may be opened. This helps to ensure a flow of air into battery pack 107, as may be required, while not running the risk of oxygen-rich effluent escaping through this valve due to one-way valve 1101. Similarly, during battery pack discharge cycling, valve 121 may be opened, thus allowing an appropriate battery pack pressure to be maintained without running the risk of ambient air, rather than oxygen-rich effluent, being inadvertently fed into the battery pack. Note that the one-way valves may be separate or may be incorporated into other system valves, i.e., valves 123 and 1101 may be combined and/or valves 121 and 1103 may be combined.

As previously noted, other inlet/outlet and piping arrangements may be used without departing from the invention. For example, FIGS. 12 and 13 illustrate an alternate configuration in which the inlet and the outlet for the gas tank are one and the same. FIG. 12 corresponds to the prior arrangement and mode of operation shown in FIG. 3 in which battery pack 107 is being charged and the oxygen-rich effluent is being compressed and stored in tank 125. FIG. 13 corresponds to the prior arrangement and mode of operation shown in FIG. 7 in which battery pack 107 is operating in a discharge cycle and the oxygen-rich effluent previously stored in tank 125 is being fed back into the battery pack. Typically in this configuration during charging valve 121, valve 123, or both, may be opened if it becomes desirable or necessary to exhaust to ambient some, or all, of the effluent generated during charging. During the discharge cycle, typically valve 123 is used, as necessary, to allow air to be exhausted out of the battery pack. During this same cycle, valve 121 may be opened to either supplant, or replace, the oxygen-rich effluent from tank 125.

In addition to controlling the oxygen concentration within the ambient environment, e.g., parking garage or charging bay, storing the oxygen-rich effluent from metal-air battery pack 107 and then introducing the effluent, either by itself or to supplement ambient air, into the battery pack during the discharge cycle achieves several benefits. First, as the electrical resistance of a metal-air cell during discharge is determined, in part, by the partial pressure of oxygen at the cathode, increasing the oxygen concentration by utilizing stored oxygen-rich effluent as described herein leads to an increase in the partial pressure of oxygen, and thus a reduction in electrical resistance. By reducing electrical resistance, the power capability of the battery pack is increased. Second, a large metal-air battery pack, for example one sized for use with an EV, may experience reduced/depleted oxygen concentrations during the discharge cycle unless sufficient airflow is forced through the pack. Utilizing the oxygen-rich effluent stored in tank 125 reduces, if not altogether eliminates, this problem, leading to improved battery pack efficiency and power capabilities.

While the basic operation of the invention has been described, it will be appreciated that a variety of modifications may be made to further enhance performance, depending upon the particulars of the system in which the invention is implemented. FIG. 14 illustrates some of these modifications to the system shown in FIGS. 3-11, although they are equally applicable to other embodiments such as the configuration shown in FIGS. 12 and 13.

In the system illustrated in FIG. 14, one or more pressure monitors 1401 are added to the system, at least one of which is mounted within battery pack 107 as shown. The output of monitor(s) 1401 is coupled to the controller, e.g., controller 115. In this embodiment, the pressure within the battery pack is monitored and used to maintain an optimal pressure within the battery pack. Thus, for example, during the charge cycle, operation of compressor 131 may be modulated to maintain the pressure in the battery pack within a desired and preset pressure range. Of course by including a pressure monitor at the compressor inlet (not shown), the controller may be used to maintain the pressure at the compressor inlet within a preset pressure range, for example by modulating compressor operation. Pressure monitor(s) 1401 may also be used during the discharge cycle to insure that the pressure within the battery pack is held within the desired pressure range, thus providing a means for setting the flow from tank 125 to the desired level.

Another system modification illustrated in FIG. 14 is the inclusion of at least one oxygen sensor 1403 for monitoring oxygen concentration within the battery pack. By monitoring the oxygen concentration within the battery pack, during the discharge cycle output from tank 125 to pack 107 can be controlled to insure efficient use of the oxygen-rich effluent. A similar outcome may be reached by first determining the rate of oxygen use for a given set of parameters (e.g., battery pack size and age, temperature, etc.), and then controlling the output from tank 125 to battery pack 107 to meet the needs of the batteries.

Another system modification illustrated in FIG. 14 is the inclusion of a heat exchanger 1405. Preferably the heat exchanger is located between battery pack 107 and compressor 131 as shown. Heat exchanger 1405 may be a simple air-air heat exchanger that cools the effluent from pack 107 prior to compression. In this embodiment, the heat exchanger utilizes ambient air for cooling, the ambient air preferably being forced through heat exchanger 1405 with a blower fan (not shown). Alternately, heat exchanger 1405 may be an air-liquid heat exchanger which is coupled to a liquid cooling system. The system may also include one or more temperature sensors, not shown, for monitoring the temperature of the effluent prior to entering compressor 131. By monitoring the temperature, the degree of cooling provided by heat exchanger 1405 may be controlled to achieve further optimization.

Figure 15:
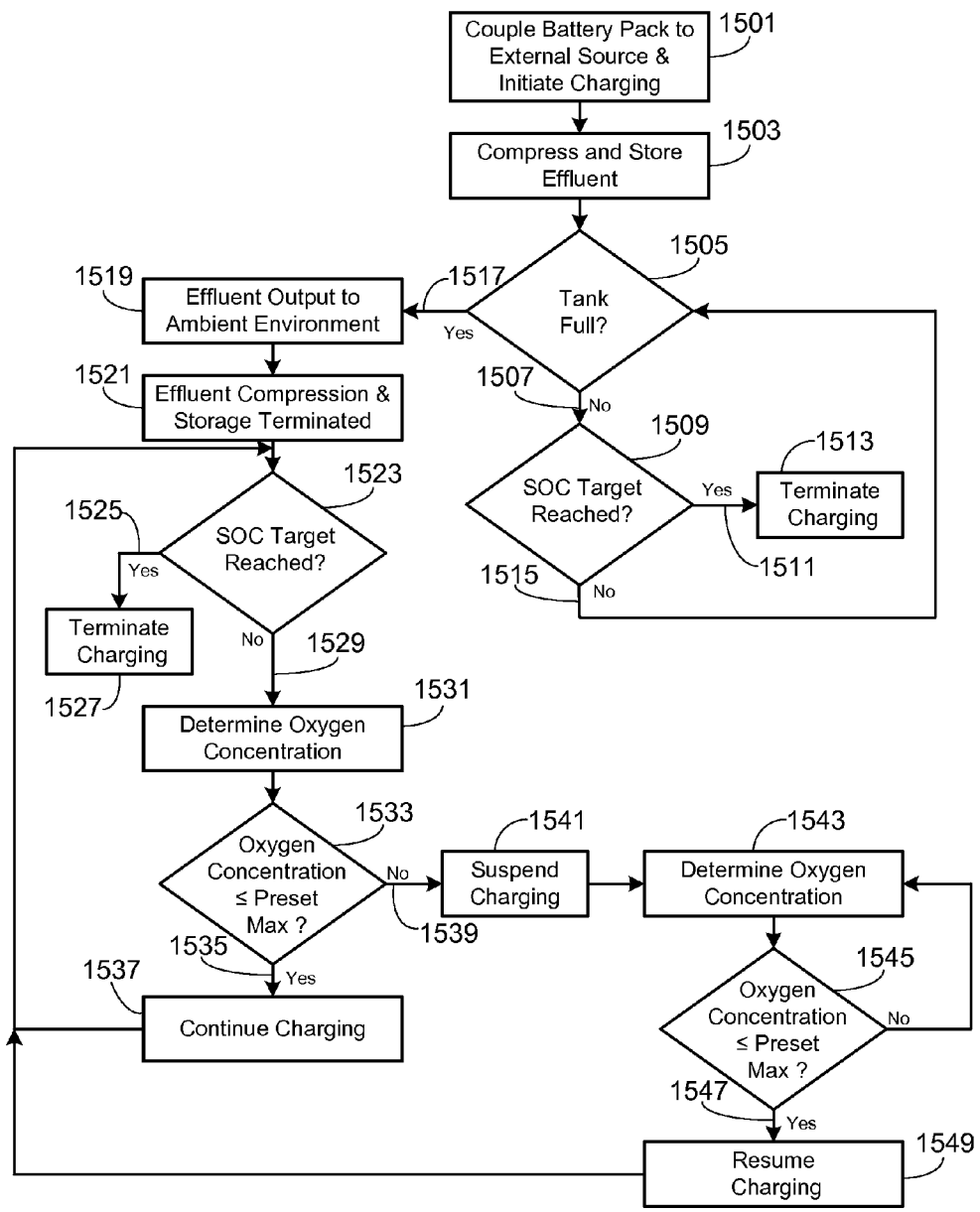
FIG. 15 illustrates a preferred methodology in accordance with the invention.

FIG. 15 illustrates a preferred methodology of the invention. As illustrated, after the battery pack/vehicle is coupled to an external power source and charging is initiated (step 1501), initially the oxygen-rich effluent is compressed and stored in tank 125 (step 1503). In step 1505, the system determines whether or not tank 125 is full. If the tank is not full (step 1507), then the system determines whether or not battery charging is complete, for example by monitoring the state-of charge (SOC) of the battery pack and comparing the monitored SOC with a target SOC (step 1509). Once the target SOC is reached (step 1511), charging is terminated (step 1513). If the target SOC has not been reached (step 1515), controller 115 continues to monitor tank 125.

Once tank 125 is full (step 1517), the system adjusts the control valves to start sending effluent into the ambient environment (step 1519). At the same time, the system terminates sending effluent to tank 125 and halts operation of compressor 131 (step 1521). The SOC of the battery pack continues to be monitored and compared to the target SOC (step 1523). As before, if the target SOC is reached (step 1525), charging is terminated (step 1527). If the target SOC has not been reached (step 1529), then the oxygen concentration is determined (step 1531), for example using one or more sensors 133, 135 or 137. The monitored oxygen concentration is compared to a preset maximum allowable level (step 1533). As long as the oxygen concentration is below the preset maximum (step 1535), charging continues (step 1537) until the SOC target is reached. If the oxygen concentration increases beyond the allowed maximum (step 1539), charging is suspended (step 1541). Once suspended, controller 115 continues to monitor the oxygen concentration (step 1543) and compare the monitored oxygen level to the preset maximum (step 1545). Once the oxygen concentration falls below the preset level (step 1547), charging resumes (step 1549).

Figure 16:
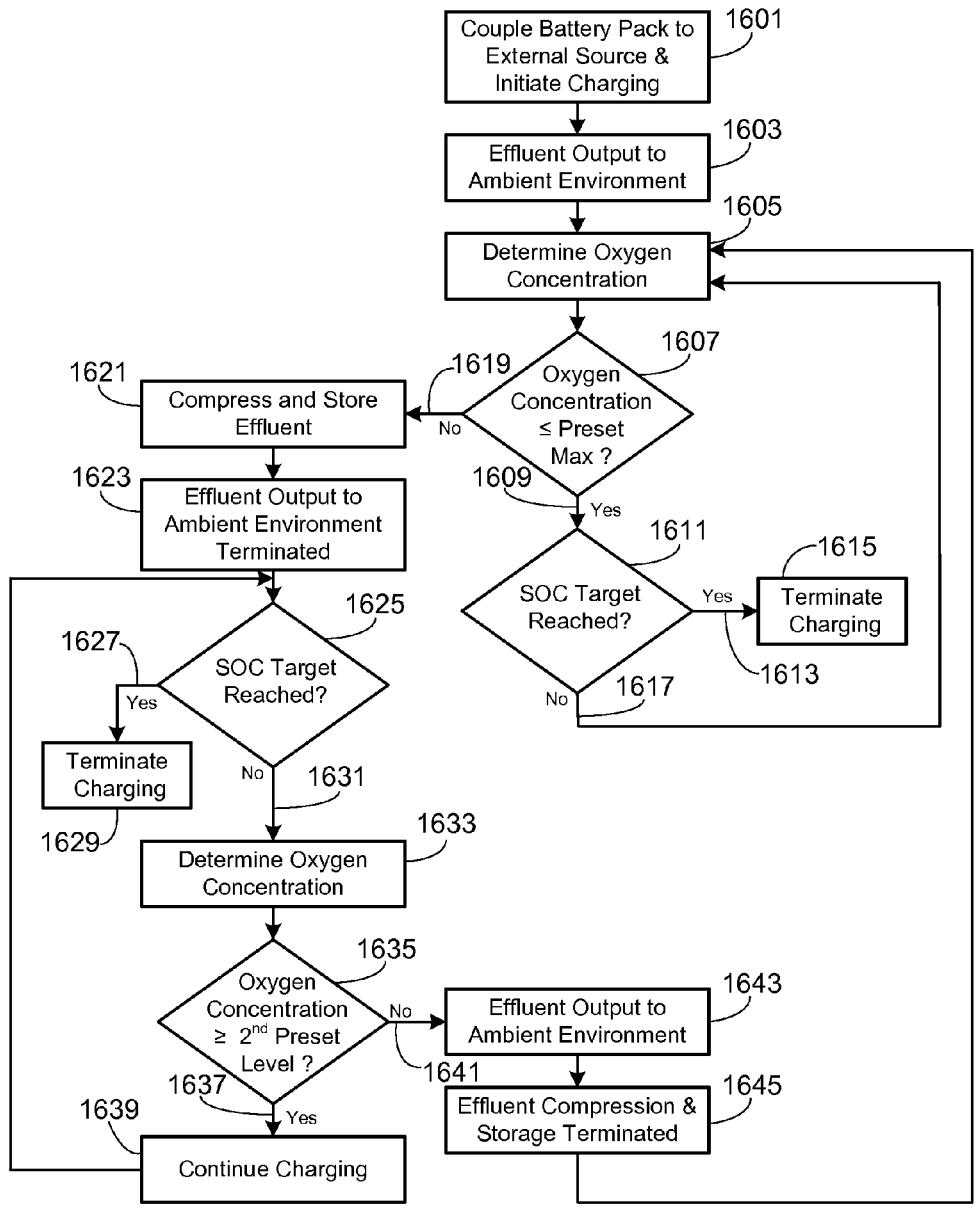
FIG. 16 illustrates an alternate preferred methodology in accordance with the invention.

In an alternate methodology illustrated in FIG. 16, oxygen-rich effluent generated during charging is normally exhausted to the ambient environment. If, however, the oxygen concentration in the ambient environment exceeds the preset maximum level, the oxygen-rich effluent is compressed and stored in tank 125. As shown in FIG. 16, after the battery pack/vehicle is coupled to an external power source and charging is initiated (step 1601), initially the oxygen-rich effluent is exhausted to the ambient environment (step 1603). The oxygen concentration is then determined (step 1605), for example using one or more sensors 133, 135 or 137, and compared to a preset maximum allowable level (step 1607). As long as the monitored oxygen concentration remains below the preset level (step 1609), the system continues to exhaust effluent to the ambient environment. The system also monitors the SOC of the battery pack, comparing the monitored SOC with a target SOC (step 1611). Once the target SOC is reached (step 1613), charging is terminated (step 1615). If the target SOC has not been reached (step 1617), controller 115 continues to monitor the oxygen concentration of the ambient environment.

If the system determines that the monitored oxygen concentration is greater than the preset level (step 1619), the system adjusts the control valves so that the effluent may be compressed and stored in tank 125 (step 1621). At the same time, the system terminates passing effluent directly to the ambient environment (step 1623). The system continues to monitor battery pack SOC and compare the monitored SOC to the SOC target (step 1625). As before, once the target SOC is reached (step 1627), charging is terminated (step 1629). If the target SOC has not yet been reached (step 1631), the system continues to monitor ambient oxygen concentration (step 1633). In step 1635 the ambient oxygen concentration may be compared to the same preset maximum allowable oxygen concentration used in step 1607. However, in the preferred embodiment and as shown in FIG. 16, during step 1635 the ambient oxygen concentration is compared to a second preset oxygen level that is lower than the first level. For example, if the first preset value (i.e., the preset maximum oxygen concentration level) is 25%, a suitable second preset value (i.e., the preset lower oxygen concentration level) may be 23% or 24%. It will be appreciated that these values are only provided as examples, and the inventors clearly envision applying other values. As long as the monitored oxygen concentration is higher than the second preset level (step 1637), charging continues (step 1639) and the system continues to monitor battery pack SOC and oxygen concentration. If the oxygen concentration drops below the second preset level (step 1641), the system adjusts the control valves to start sending effluent into the ambient environment (step 1643). At the same time, the system terminates sending effluent to tank 125 and halts operation of compressor 131 (step 1645). The system continues to monitor oxygen concentration in case it becomes necessary to suspend sending effluent to the ambient environment and instead, compressing and storing the oxygen. Additionally, the system continues to monitor battery pack SOC to determine when to terminate battery charging.

As previously described, controller 115 may be coupled to one or more oxygen concentration sensors, the sensors being located at various locations, thus insuring that the oxygen concentration within all areas remain within the desired safety range. It will be appreciated that the oxygen concentration during charging will typically be greatest at the battery pack oxygen outlet, and will decrease with distance from the oxygen outlet. Additionally, the oxygen concentration decreases based on the volume of air into which the oxygen outlet is coupled, and based on the level of mixing that occurs with the ambient environment. Thus oxygen concentration will exceed the acceptable level quicker in a single garage of 3,750 cubic feet then in a double garage of 7,500 cubic feet. Similarly, the oxygen concentration will exceed the acceptable level quicker in a closed garage than in an open garage.

As described above with respect to sensors 133, 135 and 137, the system may monitor the oxygen concentration with multiple sensors, thus taking into account the expected oxygen concentration variations based on proximity to the battery pack oxygen outlet and the conditions of the ambient environment. In at least one embodiment of the invention, associated with each sensor is a corresponding maximum concentration level, this maximum level used in determining whether to store the battery pack effluent generated during charging or release it to the ambient environment (e.g., step 1533 in the process illustrated in FIG. 15; step 1607 in the process illustrated in FIG. 16). This allows the acceptable concentration level to be preset for each particular sensor, thus taking into account the sensors location. Thus, for example, the acceptable oxygen concentration level at sensor 133, monitoring the battery pack outlet, may be set at a relative concentration level of 28% while the concentration level outside of the vehicle, for example monitored by a sensor 135, may be set at a relative concentration level of 25%. Clearly this approach may be used with more than two sensors, for example a sensor 133 mounted near the battery pack oxygen outlet, a sensor 135 mounted on an external vehicle surface, and a sensor 137 mounted within the charging bay (e.g., garage). Additionally, it will be appreciated that multiple sensors may be mounted at approximately the same relative position, thus allowing oxygen concentration values to be averaged for a particular location. Alternately, the highest monitored value may be used when multiple sensors are co-located.

In an alternate embodiment utilizing multiple sensors, e.g., sensors 133, 135 and 137, an algorithm is used to weight the oxygen concentration level determined for each sensor. The weighted concentration value is then used in determining where to transfer the effluent. For example, the oxygen concentration level near the battery pack may be given twice the weighting as the output from a sensor 135 monitoring external vehicle concentration levels, thus insuring that even if the concentration level in the charging bay is kept to an acceptable level (for example by leaving the garage door open), the charging levels near the vehicle, which may not be subject to the same level of ambient air mixing, do not reach a dangerous level.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A battery pack control system, comprising:
a battery pack comprised of at least one metal-air cell and further comprised of a battery pack air outlet and a battery pack air inlet, wherein said battery pack is configured for use within an electric vehicle and to provide power to said electric vehicle, wherein said battery pack is coupleable to a battery pack charging system, and wherein said battery pack generates oxygen-rich effluent during charging;
at least one oxygen concentration sensor;
a gas tank mounted within said electric vehicle, wherein said battery pack air outlet is coupled to a tank inlet of said gas tank, and wherein said battery pack air inlet is coupled to a tank outlet of said gas tank;
a compressor interposed between said battery pack air outlet and said tank inlet, said compressor configured to compress said oxygen-rich effluent from said battery pack air outlet prior to filling said gas tank with said oxygen-rich effluent;
an exhaust port coupled to said battery pack air outlet; and
a system controller coupled to said at least one oxygen concentration sensor and receiving an output data signal from said at least one oxygen concentration sensor, said system controller configured to determine an oxygen concentration level based on said output data signal from said at least one oxygen concentration sensor, wherein said system controller is configured to pass said oxygen-rich effluent through said exhaust port when said oxygen concentration level is below a preset concentration level and to pass said oxygen-rich effluent to said compressor and said tank inlet when said oxygen concentration level is greater than said preset concentration level.

2. The battery pack control system of claim 1, further comprising a state-of-charge (SOC) detection system, wherein said SOC detection system monitors SOC for said battery pack, and wherein said system controller terminates operation of said battery pack charging system when said SOC for said battery pack reaches a target SOC level.

3. The battery pack control system of claim 1, wherein said at least one oxygen sensor is mounted proximate to said exhaust port.

4. The battery pack control system of claim 1, wherein said at least one oxygen sensor is mounted on said electric vehicle and monitors an external vehicle environment.

5. The battery pack control system of claim 1, wherein said system controller is configured to pass said oxygen-rich effluent through said exhaust port upon initiation of battery pack charging.

6. The battery pack control system of claim 1, wherein said system controller is configured to pass said oxygen-rich effluent to said compressor and said tank inlet upon initiation of battery pack charging, and wherein said system controller is configured to pass said oxygen-rich effluent through said exhaust port when said oxygen concentration level is below said preset concentration level and said gas tank is full.

7. The battery pack control system of claim 1, further comprising a heat exchanger interposed between said battery pack outlet and said compressor.

8. The battery pack control system of claim 1, wherein said system controller is configured to pass said oxygen-rich effluent stored in said gas tank to said battery pack air inlet during a battery pack discharge cycle.

9. A method of operating a metal-air battery pack mounted within an electric vehicle, the method comprising the steps of:
    coupling said metal-air battery pack to an external charging power source via a battery charging system, wherein an oxygen-rich effluent is generated during charging of said metal-air battery pack;
    coupling a battery pack air outlet to a tank inlet of a gas tank mounted within said electric vehicle, wherein a compressor is interposed between said battery pack outlet and said tank inlet;
    compressing said oxygen-rich effluent passing through said battery pack air outlet with said compressor;
    storing said oxygen-rich effluent compressed by said compressor within said gas tank;
    monitoring a fill level corresponding to said gas tank;
    comparing said fill level to a maximum tank level;
    coupling said battery pack air outlet to an ambient air exhaust system when said fill level reaches said maximum tank level; and
    decoupling said battery pack air outlet from said tank inlet and terminating said compressing and storing steps when said fill level reaches said maximum tank level.

10. The method of claim 9, further comprising the steps of:
    determining a present metal-air battery pack state-of-charge (SOC);
    comparing said present metal-air battery pack SOC with a target SOC; and
    terminating charging of said metal-air battery pack when said present metal-air battery pack SOC reaches or exceeds said target SOC.

11. The method of claim 9, further comprising the steps of:
    determining an oxygen concentration level within a first region corresponding to said electric vehicle;
    comparing said oxygen concentration level to a preset oxygen concentration level;
    suspending charging of said metal-air battery pack if said oxygen concentration level exceeds said preset oxygen concentration level; and
    resuming charging of said metal-air battery pack when said oxygen concentration level falls below said preset oxygen concentration level.

12. The method of claim 9, further comprising the steps of decoupling said battery pack air outlet from said ambient air exhaust system and opening an ambient air battery pack inlet during a battery pack discharge cycle.

13. The method of claim 9, further comprising the steps of:
    decoupling said battery pack air outlet from said ambient air exhaust system during a battery pack discharge cycle;
    coupling a tank outlet to a battery pack air inlet during said battery pack discharge cycle; and
    transferring said oxygen-rich effluent through said tank outlet of said gas tank to said battery pack inlet of said metal-air battery pack during said battery pack discharge cycle.

14. A method of operating a metal-air battery pack mounted within an electric vehicle, the method comprising the steps of:
    coupling said metal-air battery pack to an external charging power source via a battery charging system, wherein an oxygen-rich effluent is generated during charging of said metal-air battery pack;
    coupling a battery pack air outlet to an ambient air exhaust system;
    exhausting said oxygen-rich effluent through said ambient air exhaust system;
    determining an oxygen concentration level within a first region corresponding to said electric vehicle;
    comparing said oxygen concentration level to a preset oxygen concentration level;
    decoupling said battery pack air outlet from said ambient air exhaust system and coupling said battery pack air outlet to a tank inlet of a gas tank mounted within said electric vehicle if said oxygen concentration level exceeds said preset oxygen concentration level, wherein a compressor is interposed between said battery pack outlet and said tank inlet; and
    compressing said oxygen-rich effluent passing through said battery pack air outlet with said compressor and storing said oxygen-rich effluent compressed by said compressor within said gas tank.

15. The method of claim 14, further comprising the steps of:
    comparing said oxygen concentration level to a second preset oxygen concentration level, wherein if said oxygen concentration level falls below said second preset oxygen concentration level said method further comprises the steps of:
    decoupling said battery pack air outlet from said tank inlet;
    terminating said compressing and storing steps;
    coupling said battery pack air outlet to said ambient air exhaust system; and
    exhausting said oxygen-rich effluent through said ambient air exhaust system.

16. The method of claim 15, wherein said second preset oxygen concentration level is less than said preset oxygen concentration level.

17. The method of claim 15, wherein said second preset oxygen concentration level is equivalent to said preset oxygen concentration level.

18. The method of claim 14, further comprising the steps of:
    determining a present metal-air battery pack state-of-charge (SOC);
    comparing said present metal-air battery pack SOC with a target SOC; and
    terminating charging of said metal-air battery pack when said present metal-air battery pack SOC reaches or exceeds said target SOC.

19. The method of claim 14, wherein during a battery pack discharge cycle said method further comprises the steps of:
    decoupling said battery pack air outlet from said ambient air exhaust system;

decoupling said battery pack air outlet from said tank inlet; and opening an ambient air battery pack inlet.

20. The method of claim 14, wherein during a battery pack discharge cycle said method further comprises the steps of:

decoupling said battery pack air outlet from said ambient air exhaust system;

decoupling said battery pack air outlet from said tank inlet;

coupling a tank outlet of said gas tank to a battery pack air inlet; and transferring said oxygen-rich effluent through said tank outlet of said gas tank to said battery pack inlet of said metal-air battery pack.

* * * * *